(12) United States Patent
Karhade

(10) Patent No.: US 9,112,911 B1
(45) Date of Patent: Aug. 18, 2015

(54) ADDING FIREWALL SECURITY POLICY DYNAMICALLY TO SUPPORT GROUP VPN

(75) Inventor: Madhav Karhade, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 513 days.

(21) Appl. No.: 12/984,014

(22) Filed: Jan. 4, 2011

(51) Int. Cl.
*G06F 17/00* (2006.01)
*H04L 29/06* (2006.01)
*G06F 21/62* (2013.01)
*G06F 21/60* (2013.01)

(52) U.S. Cl.
CPC .............. *H04L 63/20* (2013.01); *H04L 63/102* (2013.01); *G06F 21/604* (2013.01); *G06F 21/6218* (2013.01); *H04L 63/0227* (2013.01)

(58) Field of Classification Search
CPC ...................................................... H04L 63/20
USPC .............................................................. 726/1
See application file for complete search history.

(56) References Cited

U.S. PATENT DOCUMENTS

| | | | |
|---|---|---|---|
| 6,738,908 B1* | 5/2004 | Bonn et al. ........................ | 726/4 |
| 6,766,334 B1* | 7/2004 | Kaler et al. ........................... | 1/1 |
| 7,234,063 B1* | 6/2007 | Baugher et al. ............... | 713/189 |
| 7,516,476 B1* | 4/2009 | Kraemer et al. ................... | 726/1 |
| 7,761,419 B2 | 7/2010 | Wray | |
| 8,442,230 B1 | 5/2013 | Ng et al. | |
| 8,879,734 B2 | 11/2014 | Ng et al. | |
| 2002/0169975 A1* | 11/2002 | Good ............................. | 713/200 |
| 2003/0061340 A1 | 3/2003 | Sun et al. | |
| 2006/0123066 A1 | 6/2006 | Jacobs et al. | |
| 2007/0245163 A1* | 10/2007 | Lu et al. ......................... | 713/300 |
| 2008/0010371 A1 | 1/2008 | Yamamoto et al. | |
| 2009/0187970 A1 | 7/2009 | Mower et al. | |
| 2010/0142711 A1 | 6/2010 | Weis et al. | |
| 2011/0164752 A1* | 7/2011 | Wainner et al. ................ | 380/277 |
| 2012/0008506 A1 | 1/2012 | Astigarraga et al. | |
| 2012/0042084 A1 | 2/2012 | Dutta et al. | |

OTHER PUBLICATIONS

Natheniel Pettis et al., "Automatic Run-Time Selection of Power Policies for Operating Systems", Design, Automation and Test in Europe, 2006. Date '06. Proceedings, pp. 1-6.*
F. Barrere et al., "Automated inter-domain security policy generation," 2004, pp. 1-17.*
Baugher et al., "The Group Domain of Interpretation", Network Working Group, RFC-3547, Standards Track, Jul. 2003, 48 pages.

* cited by examiner

*Primary Examiner* — Luu Pham
*Assistant Examiner* — Canh Le
(74) *Attorney, Agent, or Firm* — Harrity & Harrity, LLP

(57) ABSTRACT

A server device receives, from a member device, a registration request for a group virtual private network (VPN) and provides an initial firewall security policy for the group VPN. The server device receives instructions for a policy configuration change and sends, to the member device, a push message that includes dynamic policies to implement the policy configuration change. The dynamic policies are implemented as a subset of a template policy. The member device receives the push message with the dynamic policies, associates the dynamic policies with the template policy, and applies the initial security policy data and the dynamic policies to incoming traffic without the need for a reboot of the member device.

21 Claims, 9 Drawing Sheets

ADDING FIREWALL SECURITY POLICY DYNAMICALLY TO SUPPORT GROUP VPN

BACKGROUND

A typical VPN (Virtual Private Network) is a network of point-to-point tunnels, where a tunnel is a Security Association (SA) between two security devices. Group VPNs have been developed that extend current Internet Protocol Security (IPsec) architecture to support group-shared SAs. The center of a group VPN includes a group server, which can be a cluster of servers.

Currently, VPN firewall security policies are configured statically via user configuration. If a user wants to modify VPN behavior then the user (e.g., a network administrator) must change the configuration manually and, thus, not in real time. With a group VPN, member access is dynamic. Thus, for effective implementation, configuration changes to the firewall security policies are needed in real-time.

SUMMARY

In one implementation, a method performed by a server device may include receiving, by a server device and from a member device, a registration request for a group virtual private network (VPN); sending, by the server device and to the member device, initial security policy data; receiving, by the server device, instructions for a policy configuration change; and sending, by the server device and to the member device, a push message including the policy configuration change, where the policy configuration change includes one or more dynamic policies to be implemented as a subset and children of a template policy.

In another implementation, a device may include a memory to store instructions and a processor. The processor may execute instructions in the memory to: receive, from a member device, a registration request for a group VPN; send, to the member device, initial security policy data; receive instructions for a policy configuration change; and send, to the member device, a push message including the policy configuration change, where the policy configuration change includes one or more dynamic policies to be associated with a template policy and to be implemented with a range of source addresses or a range of destination addresses of the template policy.

In still another implementation, a method performed by a member device of a group VPN may include sending, by the member device and to a group server, a registration request for the group VPN; receiving, by the member device and from the group server, initial security policy data; receiving, by the member device and from the group server, a push message including a policy configuration change where the policy configuration change includes one or more dynamic policies to be implemented as a subset of a template policy; associating, by the member device, the one or more dynamic policies with the template policy; and conducting, by the member device, a policy lookup for incoming traffic using the initial security policy data and the one or more dynamic policies.

In another implementation, a device may include a memory to store instructions and a processor. The processor may execute instructions in the memory to: send, to a group server, a registration request for a group VPN; receive, from the group server and based on the request, initial security policy data; and apply, to incoming traffic for the VPN, the initial security policy. The processor may also execute instructions in the memory to: receive, from the group server, a push message including a policy configuration change where the policy configuration change includes one or more dynamic policies to be implemented in a template policy; associate the one or more dynamic policies with the template policy; and apply, to incoming traffic for the VPN, the initial security policy data and the one or more dynamic policies.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Systems and/or methods described herein may provide a mechanism for providing firewall security policy changes dynamically for members in a group VPN. In one implementation, a group server may receive, from a member device, a registration request for the group VPN and may send, based on the request, initial security policy data. The server device later may send, to the member device, a push message that includes dynamic policies to implement a policy configuration change. The dynamic policies may be implemented as a subset of a template policy configured on the member device. The member device may receive the push message with the dynamic policies, may associate the dynamic policies with the template policy, and may apply the initial security policy data and the dynamic policies to incoming traffic without the need for a reboot of the member device.

The term "traffic," as used herein, may refer to a flow of packets to an interface, channel, or port. The term "packet," as used herein, may refer to a packet, a datagram, or a data item; a fragment of a packet, a fragment of a datagram, or a fragment of a data item; or another type, arrangement, or packaging of data.

Figure 1:
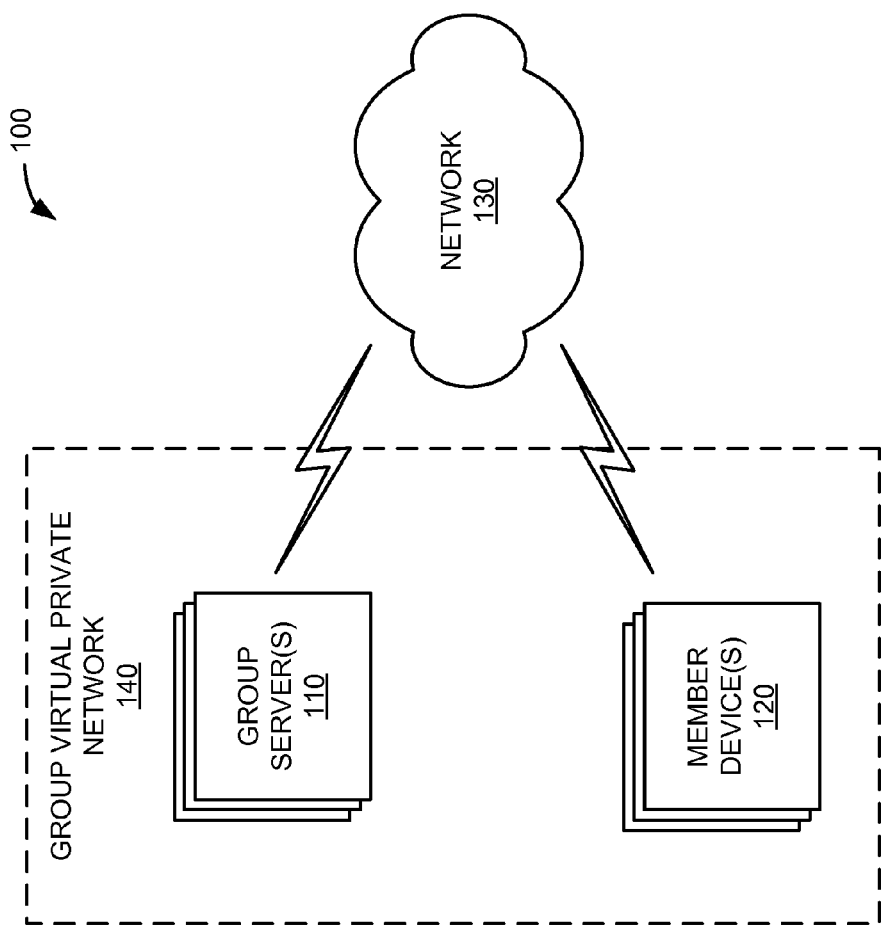
FIG. 1 is a diagram of an example network in which concepts described herein may be implemented.

FIG. 1 is diagram of an example network 100 in which concepts described herein may be implemented. Network 100 may include one or more group servers 110 (referred to herein generically and singularly as "group server 110") and one or more member devices 120 (referred to herein generically and singularly as "member device 120") interconnected by a network 130. Group server(s) 110 and member device(s)

120 may connect via wired and/or wireless connections. Group server(s) 110 and member device(s) 120 may be connected within a group virtual private network (VPN) 140.

Group server 110 may include one or more server devices, or other types of computation or communication devices, that gather, process, search, store, and/or provide information in a manner similar to that described herein. For example, group server 110 may host an interface application that may be used to form group VPN 140 with member devices 120. Group server 110 may manage firewall security policies for group VPN 140. Group server 110 may distribute firewall security policy configurations to member devices 120 and may implement procedures to ensure that policy updates sent from group server 110 are dynamically implemented by member devices 120. In one implementation, group server 110 may include redundancy support, such that when one group server 110 goes down, a backup group server 110 may continue to provide services for group VPN 140.

Member device 120 may include any device that is capable of communicating with group server 110 and/or another member device 120 via network 130. For example, member device 120 may include a laptop computer, a personal computer, a set-top box (STB), a gaming system, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device (e.g., a wireless telephone), a cellular telephone, a smart phone, other types of mobile communication devices, a global positioning system (GPS) device, a content recording device (e.g., a camera, a video camera, etc.), etc. In one implementation, member device 120 may be capable of receiving (e.g., from group server 110) push messages, such as multicast push messages or unicast push messages. The push messages may include updates to firewall security policies based on, for example, activation of a template policy. Member device 120 may also be capable of implementing the updates to firewall security policies in a dynamic manner. Member devices 120 may be referred to as group VPN members.

Network 130 may include a local area network (LAN), a wide area network (WAN), a metropolitan area network (MAN), a telephone network, such as the Public Switched Telephone Network (PSTN) or a cellular network, the Internet, an intranet, other networks, or a combination of networks.

Group VPN 140 may be implemented using security association protocols that use secure keys to permit communications among multiple group VPN members (e.g., member devices 120) and between group servers 110 and multiple group VPN members (e.g., member devices 120). For example, a key encapsulation key (KEK) may be used to protect messages between group server 110 and member devices 120. To maintain secure communications within group VPN 140, the secure keys may be changed (e.g., "re-keyed") occasionally. Group VPN tunnels may be automatically set up based on traffic, and the policies for group VPN 140 may be pushed down to member device 120 from group server 110 using, for example, KEK-encrypted messages.

In implementations described herein, group VPN 140 may employ dynamic security policies. The dynamic security policies can be added "on the fly" without making configuration changes via a command line interface (CLI) or Web interface. In implementations described herein, a network administrator may configure one or more template policies. Each template policy may be configured similar to a regular policy (e.g., including one or more source IP addresses, destination IP addresses, source ports, destination ports, and/or protocols that may be used to match/filter incoming traffic) and may be included with the system (e.g., a lookup table) in the same order is which they are configured. The templates policy itself may not be used (e.g., by member devices 120) to match traffic to a particular policy, but may serve as a place holder. Once the template policy is added (e.g., during a VPN registration between member device 120 and group server 110), dynamic policy changes may be implemented by pushing new dynamic policies to (or deleting old dynamic policies from) the template policy on member device 120. The dynamic policies may be associated with the correct template policy by using a unique template policy identifier for each template policy.

Although FIG. 1 shows example devices of network 100, in other implementations, network 100 may include fewer devices, different devices, differently arranged devices, and/or additional devices than those depicted in FIG. 1. Alternatively, or additionally, one or more devices of network 100 may perform one or more other tasks described as being performed by one or more other devices of network 100. For example, a device may function as both a group server 110 and a member device 120.

Figure 2:
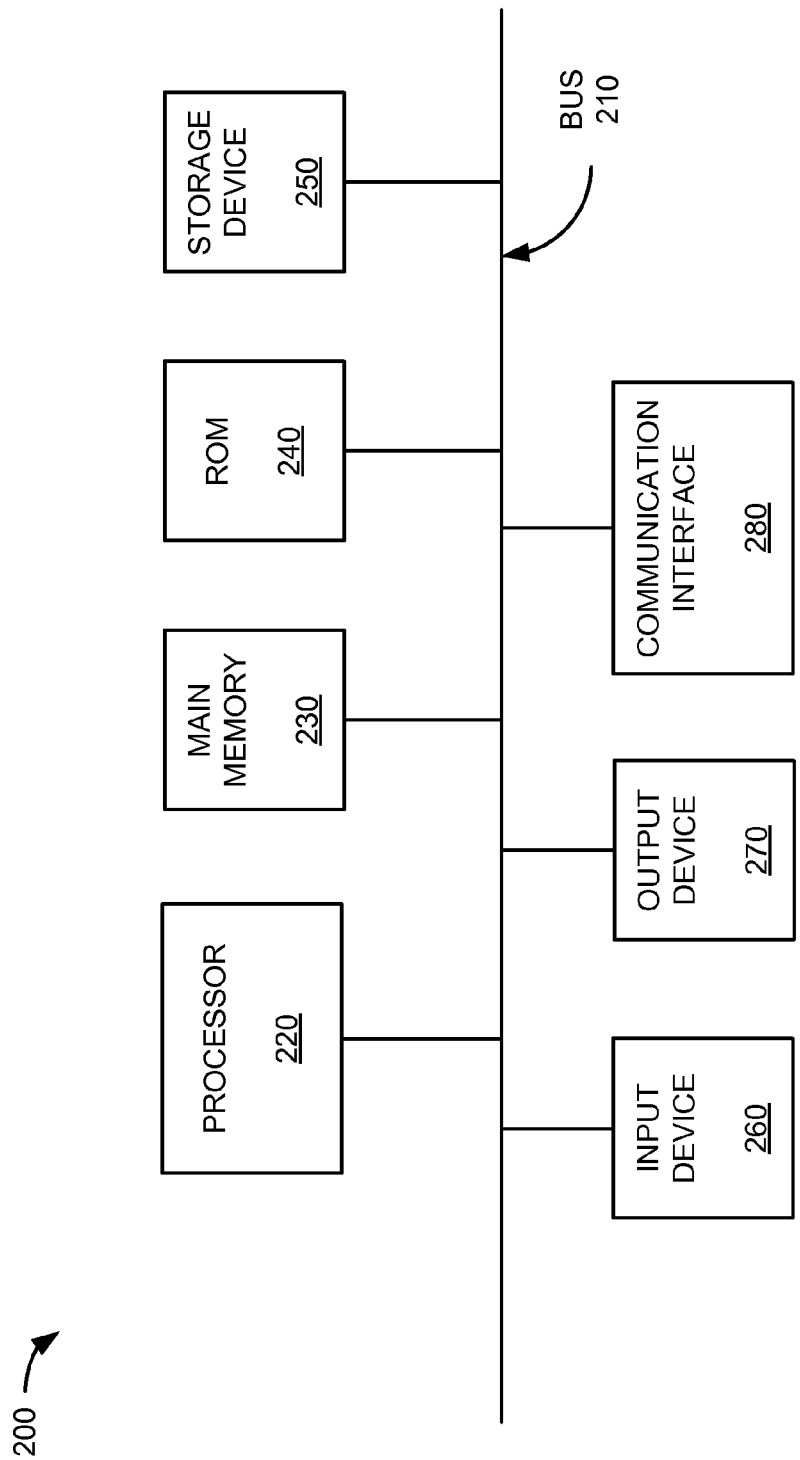
FIG. 2 is a block diagram of an example device of FIG. 1.

FIG. 2 is a block diagram of an example device 200, which may correspond to one of group server 110 and/or member device 120. As shown, device 200 may include a bus 210, a processor 220, a main memory 230, a read only memory (ROM) 240, a storage device 250, an input device 260, an output device 270, and a communication interface 280. Bus 210 may include a path that permits communication among the elements of the device.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to the device, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the device to communicate with other devices and/or systems.

As will be described in detail below, device 200 may perform certain operations relating to providing security policy configuration updates. Network device 200 may perform these operations in response to processor 220 executing software instructions contained in a computer-readable medium, such as main memory 230. A computer-readable medium may be defined as a non-transitory memory device. A memory device may include memory space within a single physical memory device or spread across multiple physical memory devices. The software instructions may be read into main memory 230 from another computer-readable medium, such as data storage device 250, or from another device via communication interface 280. The software instructions contained in main memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. As an example, in some implementations, input device 260 and/or output device 270 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
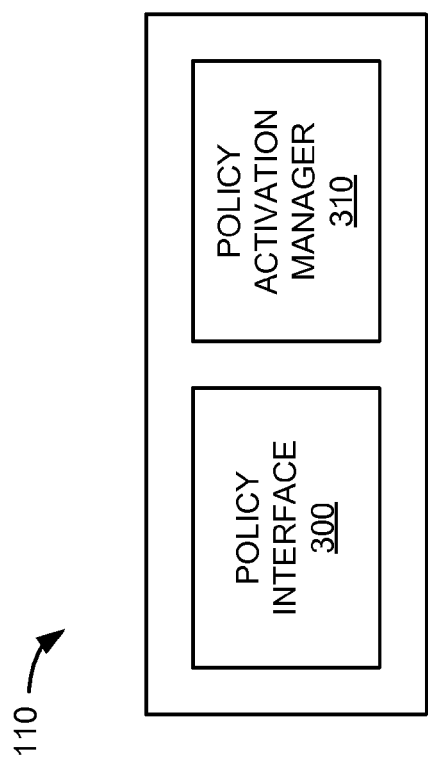
FIG. 3 is a block diagram of example functional components of a group server of FIG. 1.

FIG. 3 is a block diagram of example functional components of group server 110. In one implementation, the functions described in connection with FIG. 3 may be performed by one or more components of device 200 (FIG. 2). As illustrated, group server 110 may include a policy interface 300 and a policy activation manager 310.

Policy interface 300 may include hardware or a combination of hardware and software to accept and/or modify policy configurations. For example, policy interface 300 may include a CLI, a graphical interface, or a web-based interface to receive changes to a policy table made by, for example, a network administrator. Policy interface 300 may store a copy of the policy table, and any changes, in a memory (e.g., memory 230) associated with group server 110. The policy table may include, for example, configured policy entries and/or template policy entries. Configured (e.g., regular) policy entries may include policies with particular configurations that are statically configured on member devices 120. Policy interface 300 may receive dynamic policy entries that may be defined to fit under a template policy, or place-holder, within the member devices 120.

The template policy may be assigned a unique identifier or keyword that member device 120 may recognize in the policy table. Within the template policy one or more dynamic policies may be added. Policy interface 300 may receive one or more new dynamic policies (e.g., entered by a network administrator, transferred over communication interface 280, etc.), associate the dynamic policies with the template policy identifier, and provide the dynamic policies(s) to policy activation manager 310 for distribution to member devices 120. In one implementation, policy activation manager 310 may provide dynamic policies as a group update of all dynamic policies associated with a policy template. In another implementation, policy activation manager 310 may include only changes (e.g., additions/deletions/substitutions) related to particular dynamic polices within a template policy.

Policy activation manager 310 may include hardware or a combination of hardware and software to distribute secure policy tables and dynamic policy changes to enable new policy implementation without interruption to member devices 120. Policy activation manager 310 may also manage re-transmissions of dynamic policies. Policy activation manager 310 may distribute initial security policies to member devices 120 as part of a group VPN registration. For example, policy activation manager 310 may provide initial security policies to member device 120 as a point-to-point message (e.g., as a pull reply in response to a pull request from member device 120). Policy activation manager 310 may later provide dynamic updates to the security policies via unicast or multicast push messages (e.g., KEK-encrypted unicast push messages or multicast push messages). Policy activation manager 310 may distribute the dynamic updates to the security policies, as generated by policy interface 300, whenever policy interface 300 provides dynamic updates to the security policies. Dynamic updates may include, for example, policy additions, policy deletions, and/or clearing a template policy. For example, policy activation manager 310 may initiate dynamic updates to the security policies for group VPN 140, based on a configuration change from a network administrator (e.g., as supplied via policy interface 300).

Although FIG. 3 shows example functional components of group server 110, in other implementations, group server 110 may include fewer functional components, different functional components, differently arranged functional components, or additional functional components than depicted in FIG. 3. Alternatively, or additionally, one or more functional components of group server 110 may perform one or more other tasks described as being performed by one or more other components of group server 110.

Figure 4:
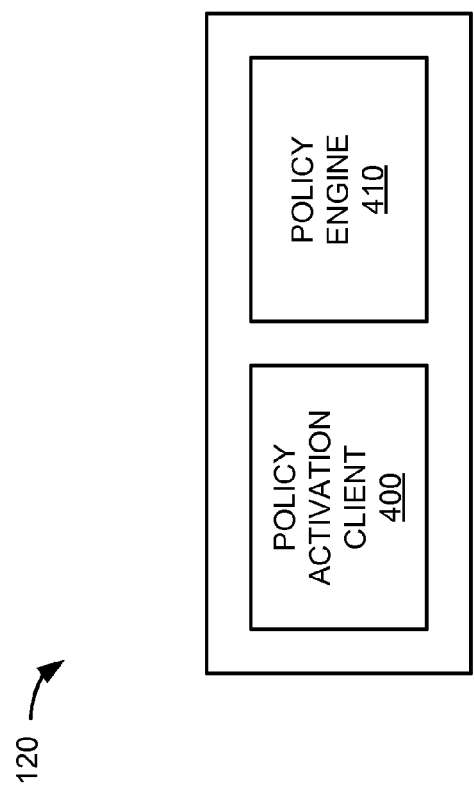
FIG. 4 is a block diagram of example functional components of a member device of FIG. 1.

FIG. 4 is a block diagram of example functional components of member device 120. In one implementation, the functions described in connection with FIG. 4 may be performed by one or more components of device 200 (FIG. 2). As illustrated, member device 120 may include a policy activation client 400 and a policy engine 410.

Policy activation client 400 may include hardware or a combination of hardware and software to manage insertion of secure policy tables and dynamic policy changes for member device 120. Policy activation client 400 may receive an initial secure policy table which may be statically configured during initialization of member device 120. Policy activation client 400 may store the policy table, and any changes, in a memory (e.g., memory 230) associated with member device 120. The policy table may include, for example, configured policy entries and/or template policy entries. Configured (e.g., regular) policy entries may include policies with particular configurations defined by, for example, a network administrator. Dynamic policy entries may be defined to fit under a template policy, or place-holder, that defines the scope of the policy (e.g., the largest set of addressed to which a dynamic policy may be applied). The template policy may be assigned a unique identifier or keyword within the policy table. Within the template policy, one or more dynamic policies may be added.

Member device 120 may register with a server device 110 for group VPN 140. After registration, when receiving a multicast push message (e.g., from policy activation manager 310) with dynamic policy changes, policy activation client 400 may add the dynamic policy changes to a memory component (e.g., memory 230) associated with a template policy identifier.

In one implementation, policy activation client 400 may compare a newly-received dynamic policy changes with a current dynamic policy to determine if the newly-received dynamic policy changes should be accepted. For example, each dynamic policy change may include an identifier (e.g., time-stamp, versions indicator, or anther identifier), and policy activation client 400 may compare the newly-received identifier with the current identifier. If the new identifier is newer than the current identifier, policy activation client 400 may cause member device 120 to accept the new dynamic policy changes. Conversely, a "new" dynamic policy with an equivalent or older version identifier may be discarded. Performing this check of identifiers may prove especially useful when the normal behavior is to send multiple copies of a dynamic policy change (e.g., as push messages from group server 110 to member devices 120 in an unacknowledged multicast scenario).

Policy engine 410 may include hardware or a combination of hardware and software to implement secure policy tables and dynamic policy changes received from policy activation manager 310 and stored by policy activation client 400. Policy engine 410 may not differentiate between a regular (configured) policy and a dynamic policy once the dynamic policy is added to member device 120. Once added, the newly-added dynamic-policy may then appear in the policy search if it matches traffic, which can alter the behavior of member device 120 dynamically. No reconfiguration and re-commit or reboot is required to add, delete, clear, etc. the dynamic policy.

In one implementation, policy engine 410 may perform a lookup sequence for packets received by member device 120. If a configured policy is included first in a lookup sequence, then policy engine 410 may match incoming packets with the configured policy in a conventional fashion. Thus, if a packet is matched to a regular policy before the lookup sequence reaches a template policy, policy engine 410 may return a configured policy for the packet. If policy engine 410 reaches a template policy in the lookup sequence, policy engine 410 may launch a search of dynamic policies associated with the template policy. If a matching dynamic policy is found, then policy engine 410 may provide a dynamic policy for the packet. If a matching dynamic policy is not found, then policy engine 410 may continue with the lookup sequence. For example, policy engine 410 may return a default policy, or may continue searching for another configured policy or template policy in the lookup sequence. Thus, the dynamic policy may be include as part of a two dimensional search, where a first search level includes the configured policy and policy templates, and where the second search level includes the dynamic policies associated with each policy template.

Although FIG. 4 shows example functional components of member device 120, in other implementations, member device 120 may include fewer functional components, different functional components, differently arranged functional components, or additional functional components than depicted in FIG. 4. Alternatively, or additionally, one or more functional components of member device 120 may perform one or more other tasks described as being performed by one or more other components of member device 120.

Figure 5:
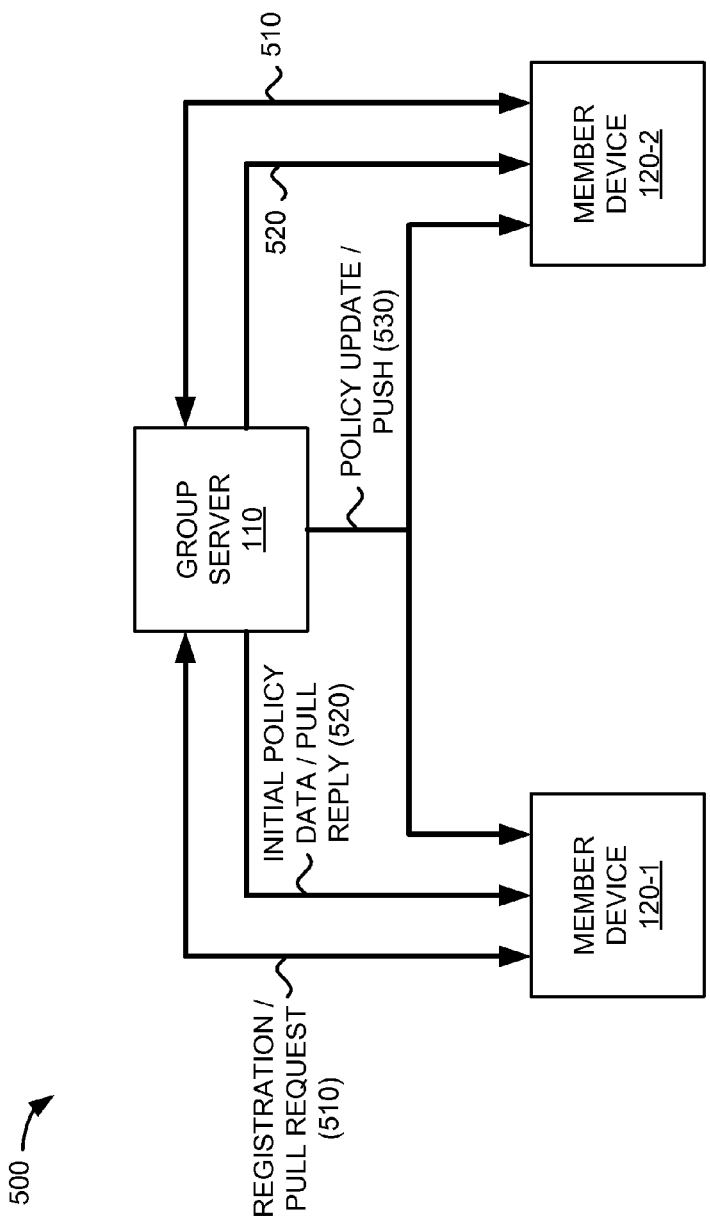
FIG. 5 is a diagram of example interactions among components of an example portion of the network illustrated in FIG. 1.

FIG. 5 is a diagram of example interactions among components of an example portion 500 of network 100. As illustrated, example network portion 500 may include group server 110 and two member devices 120 (referred to individually in FIG. 5 as member device 120-1 and member device 120-2). Group server 110 and member devices 120 may include the features described above in connection with, for example, one or more of FIGS. 1-4.

As further shown in FIG. 5, member device 120-1 and member device 120-2 may each conduct a separate registration process (e.g., to register as part of group VPN 140) with group server 110, as indicated by reference numbers 510. Registrations 510 may occur simultaneously or at separate times. As part of registration 510 process, group server 110 may receive an initial pull request from each member device 120-1 and 120-2. In response to the pull requests, group server 110 may separately provide initial secure policy data, as a pull reply, to each of member device 120-1 and 120-2, as indicated by reference numbers 520. In implementations described herein, initial secure policy information 520 may include a lookup table including a configured policy and one or more template policies.

After initial policy data 520, group server 110 may provide a policy update 530 for initial policy data 520 to all active members of the group VPN. Policy update 530 may be sent using a push message (e.g., separate unicast push messages or a multicast push message) to all member devices 120 of group VPN 140, including each of member devices 120-1 and 120-2. In one implementation, policy update 530 may include a template policy identifier to associate one or more dynamic policies (e.g., included within policy update 530) with a particular template policy in initial policy data 520. Policy update 530 may include an update for one or more dynamic policies to be associated with a template policy identifier in initial secure policy data 520.

Member devices 120 may receive policy update 530 and apply policy update 530 to a template policy in initial secure policy data 520. As soon as each of member devices 120 add/remove the dynamic policies associated with the template policy identifier, member devices 120 (e.g., policy engine 410) may encounter policy update 530 in a subsequent policy lookup (e.g., for a next packet) without any need for a reconfiguration and re-commit or reboot of member devices 120.

Although FIG. 5 shows example components of network portion 500, in other implementations, network portion 500 may include fewer components, different components, differently arranged components, and/or additional components than depicted in FIG. 5. Alternatively, or additionally, one or more components of network portion 500 may perform one or more other tasks described as being performed by one or more other components of network portion 500.

Figure 6:
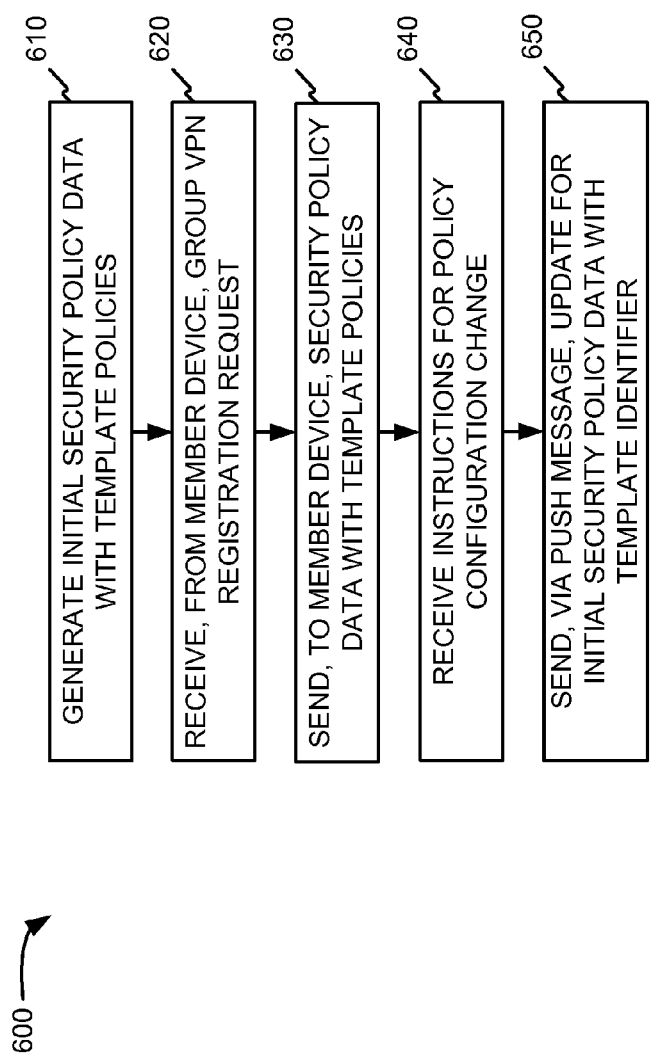
FIG. 6 is a flow diagram illustrating an example process for providing security policy configuration updates to a member device according to an implementation described herein.

FIG. 6 is a flow diagram illustrating an example process 600 for providing security policy configuration updates to a member device according to an implementation described herein. In one implementation, process 600 may be performed by group server 110. In another implementation, process 600 may be performed by another device or group of devices including or excluding group server 110.

Process 600 may include generating initial security policy data with one or more template policies (block 610), receiving, from a member device, a group VPN registration request (block 620), and sending, to the member device, the initial security policy data with the one or more template policies (block 630). For example, as referring to communications in FIG. 5, member device 120-1 and member device 120-2 may each conduct a separate registration process (e.g., to register as part of group VPN 140) with group server 110, as indicated by reference numbers 510. Registrations 510 may occur simultaneously or at separate times. As part of registration 510 process, group server 110 may receive an initial pull request from each member device 120-1 and 120-2. In response to the pull requests, group server 110 may separately provide initial secure policy data, as a pull reply, to each of member device 120-1 and 120-2, as indicated by reference numbers 520. In implementations described herein, initial secure policy information 520 may include a lookup table including a configured policy and one or more template policies.

Process 600 may further include receiving instructions for a policy configuration change (block 640), and sending, via a push message, an update for the initial security policy data template identifier (block 650). For example, as referring to communications in FIG. 5, after sending initial policy data 520, a network administrator may provide updates (e.g., via profile interface 300) to initial policy data 520. Profile interface 300 may provide the updates to policy activation manager 310 for distribution. Group server 110 (e.g., policy activation manager 310) may provide policy update 530 for initial policy data 520 to all active member devices 120 of the group VPN. Policy update 530 may be sent using a push message (e.g., separate unicast push messages or a multicast push message) to all member devices 120 of group VPN 140, including each of member devices 120-1 and 120-2. In one implementation, policy update 530 may include a template policy identifier to associate one or more dynamic policies (e.g., included within policy update 530) with a particular template policy in initial policy data 520. Policy update 530 may include an update for one or more dynamic policies to be associated with a template policy identifier in initial secure policy data 520.

Figure 7:
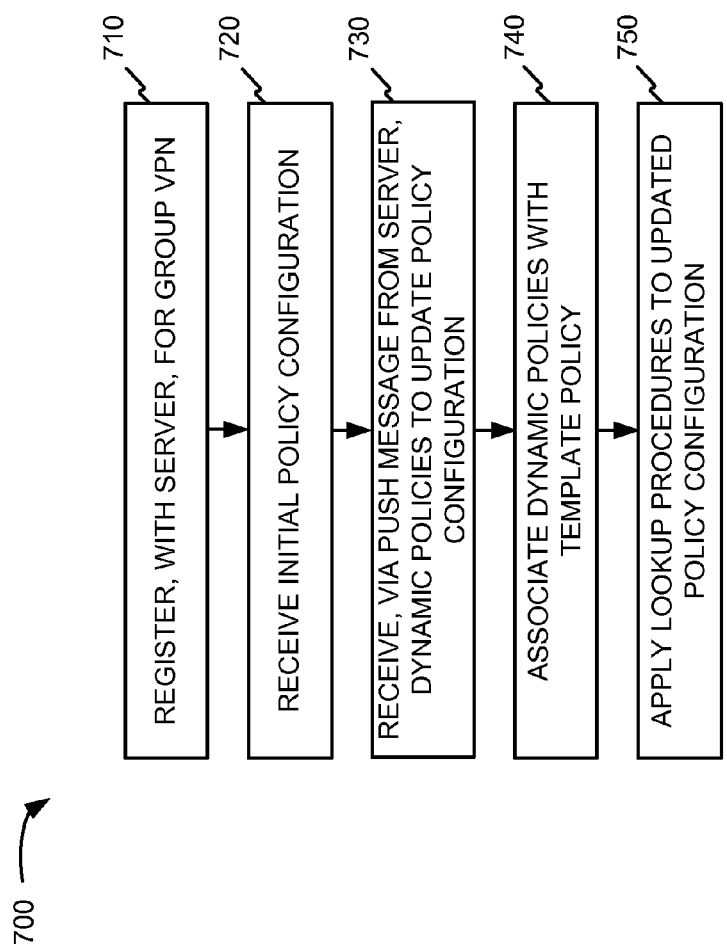
FIG. 7 is a flow diagram illustrating an example process for enacting security policy configuration updates from a server according to another implementation described herein.

FIG. 7 is a flow diagram illustrating an example process 700 for enacting security policy configuration updates from a server according to an implementation described herein. In one implementation, process 700 may be performed by member device 120. In another implementation, process 700 may be performed by another device or group of devices including or excluding member device 120.

Process 700 may include registering with a server for a group VPN (block 710), and receiving, from the server, initial security policy data (block 720). For example, member device 120 (e.g., policy client 400) may receive initial security policy data from group server 110 (e.g., policy activation manager 310) upon registration for group VPN 140.

Process 700 may include receiving, via a push message from the server, dynamic policies to update the policy configuration (block 730) and associating the dynamic policies with the template policy (block 740). For example, member device 120 (e.g., policy activation client 400) may receive a multicast push message (e.g., from policy activation manager 310 of group sever 110) with one or more dynamic policies. The dynamic policies may include a template identifier and policy changes that may be associated with a policy template. Member device 120 (e.g., policy activation client 400) may add the dynamic policy to a memory component (e.g., memory 230) associated with the template policy identifier. The dynamic policies may be implemented by member device 120 (e.g., policy engine 410) in real time.

Process 700 may include applying lookup procedures to the updated policy configuration (block 750). For example, member device 120 (e.g., policy engine 410) may implement dynamic policy changes received from group server 110 (e.g., policy activation manager 310) and stored by policy activation client 400. Member device 120 may not differentiate between a regular (configured) policy and a dynamic policy once the dynamic policy is added to member device 120. The newly-added dynamic policies may then appear in the policy search if one of the dynamic policies matches incoming traffic, which can alter the behavior of member device 120 dynamically. No reconfiguration and re-commit or reboot is required to add, delete, clear, etc. the dynamic policy.

Figure 8:
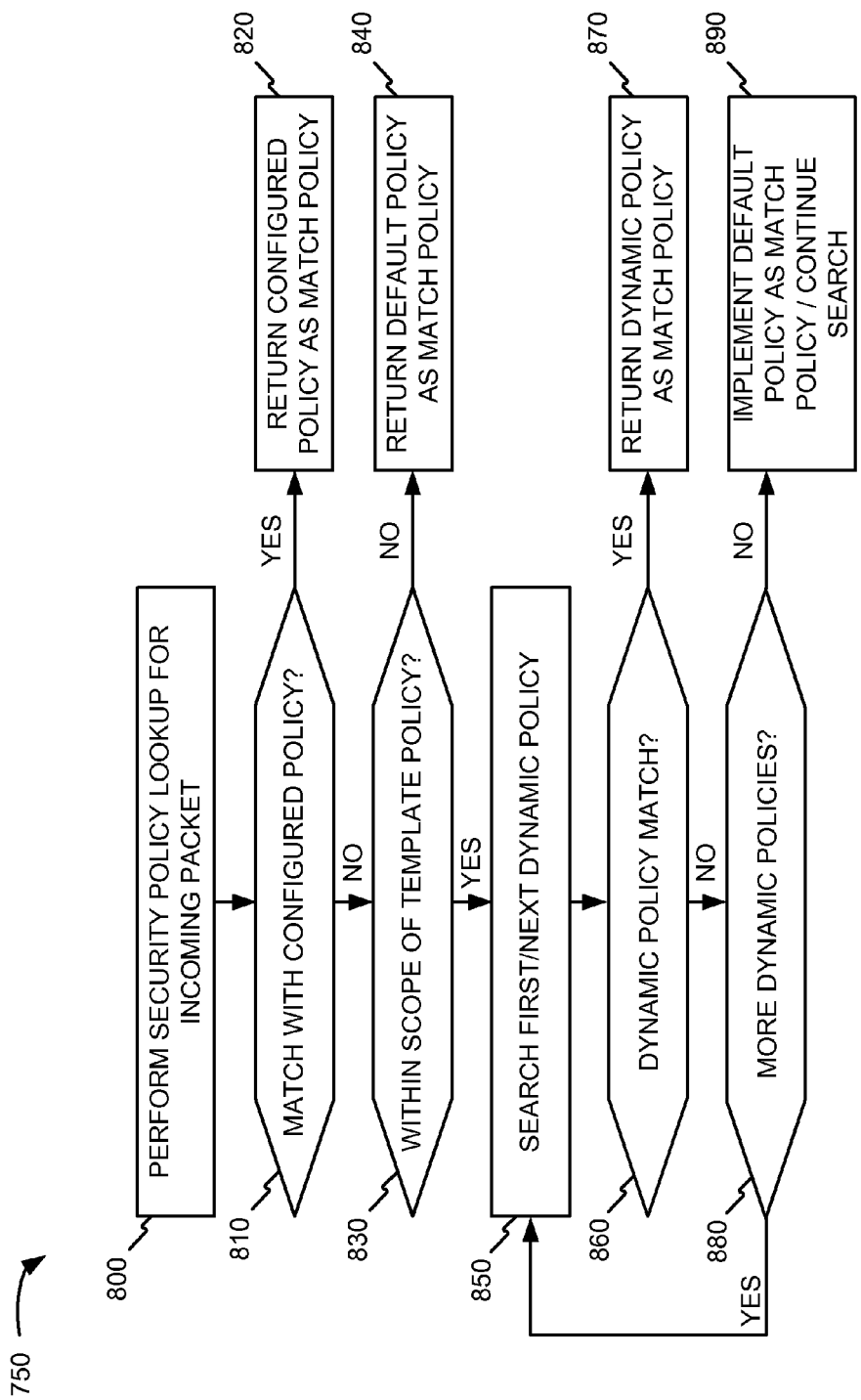
FIG. 8 is a flow diagram of an example policy search routine to implement dynamic policies.

FIG. 8 provides an example of a policy search routine to implement dynamic policies. In one implementation, the process of FIG. 8 may be applied to process block 750 of FIG. 7. As shown in FIG. 8, process block 750 may include performing a security policy lookup for an incoming packet (block 800). If there is a match with a configured policy (block 810—YES), the configured policy may be returned as a match policy (block 820). If there is not a match with a configured policy (block 810—NO), it may be determined if the packet is within the scope of a template policy (block 830). For example, assuming a configured policy is included first in a lookup sequence, member device 120 (e.g., policy engine 410) may match incoming packets with the configured policy in conventional fashion. Thus, if a packet is matched to a regular policy before the lookup sequence reaches a template policy, policy engine 410 may return a configured policy for the packet. If policy engine 410 does not find a match in the configured policies, policy engine 410 may reach a template policy in the lookup sequence. The template policy may have a designated placeholder range that is a superset of all dynamic policies within the template policy.

If the packet is not within the scope of the template policy (block 830—NO), a default policy may be returned as a match policy (block 840). If the packet is within the scope of the template policy (block 830—YES), a first dynamic policy within the template policy may be searched (block 850). For example, member device 120 (e.g., policy engine 410) may apply a default policy if there the packet is not within a designated range of the template policy. But if the packet is within the scope of the template policy, policy engine 410 may launch a search of dynamic policies associated with the template policy. The search of the dynamic policies may be conducted as a second tier search, according to the sequence of dynamic policies.

If there is a match within the dynamic policy (block 860—YES), the dynamic policy may be returned as a match policy (block 870). If there is not a match within the dynamic policy (block 860—NO), it may be determined if more dynamic policies are available to be searched (block 880). If more dynamic policies are available to be searched (block 880—YES), a next dynamic policy within the template policy may be searched (block 850). If no more dynamic policies are available to be searched (block 880—NO), a default policy may be returned as a match policy or the search may be continued (block 890). For example, if a matching dynamic policy is found, then policy engine 410 may apply a dynamic policy for the packet. If a matching dynamic policy is not found, then policy engine 410 may return a default policy, or may continue searching for another configured policy or template policy in the lookup sequence. Thus, the dynamic policy may be included as part of a two dimensional search, where a first search level includes the configured policy and policy templates, and where the second search level includes the dynamic policies associated with each policy template.

Figure 9:
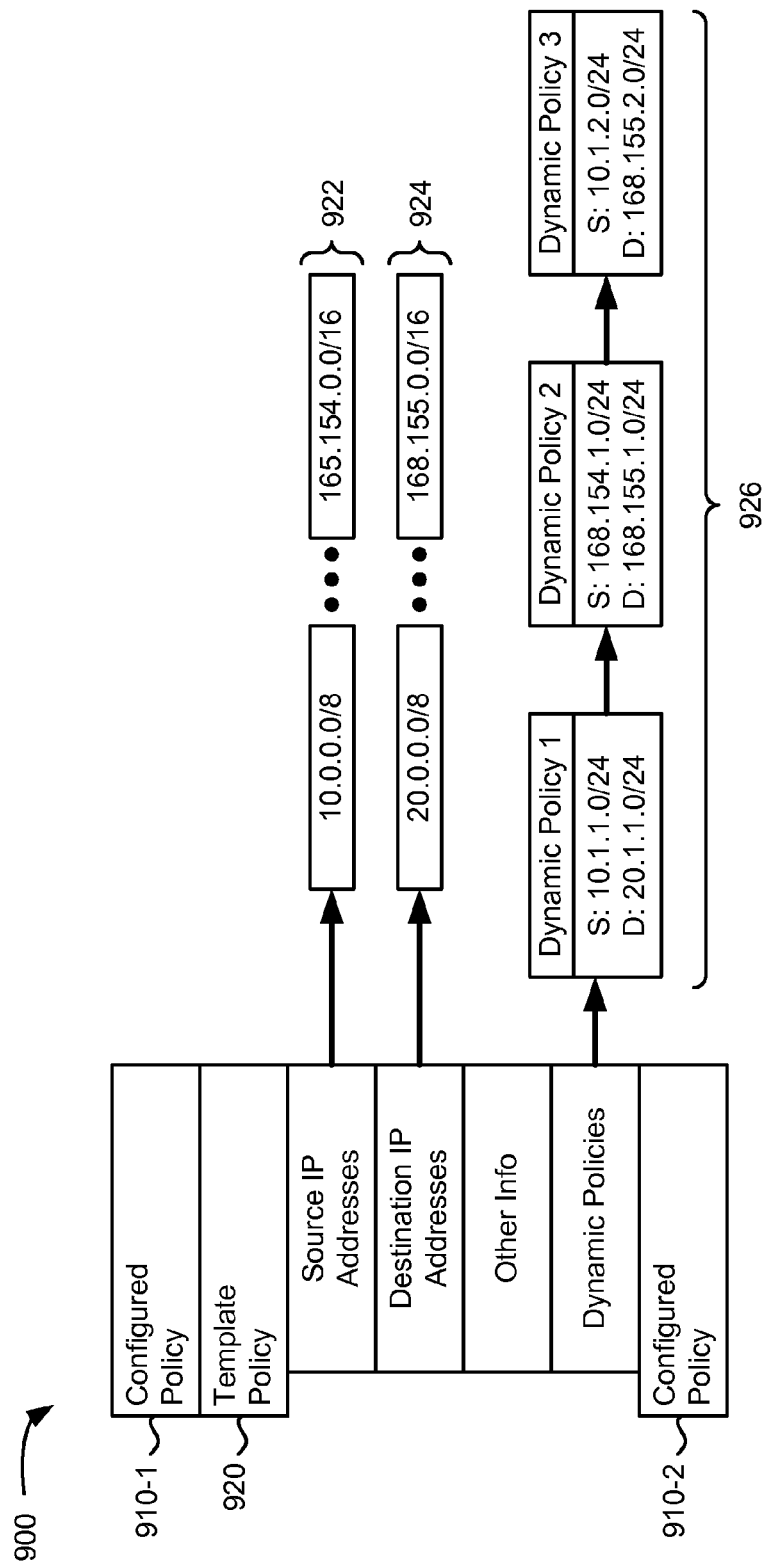
FIG. 9 is an example configuration of a firewall security policy according to an implementation described herein.

FIG. 9 is an example configuration 900 of a firewall security policy to illustrate a relationship between a configured policy, a template policy, and dynamic policies. As shown in FIG. 9, configuration 900 may include configured policies 910-1 and 910-2 (referred to herein collectively as "configured policies 910" and generically as "configured policy 910") and a template policy 920. Two configured policies 910 and one template policy 920 are shown in FIG. 9 for simplicity. In practice there may be fewer policies, different policies, differently arranged policies, and/or additional policies than depicted in FIG. 9.

A member device (e.g., member device 120) of a group VPN (e.g., group VPN 140) may conduct a policy search on incoming traffic using configuration 900. For example, member device 120 (e.g., policy engine 410) may attempt to match an incoming packet (not shown) to configured policy 910-1, then to template policy 920, and then to configured policy 910-2. If there is no match for any of configured policy 910-1, template policy 920, or configured policy 910-2, member device 120 may apply a default policy (not shown) to the packet.

Configured policies 910 may include conventional policies as configured by, for example, a network administrator. Configured policies 910 may include one or more source IP addresses, destination IP addresses, source ports, destination ports, and/or protocols that may be used to match/filter incoming traffic. Configured policies 910 may not be changed within member device 120 without performing a reconfiguration and re-commit sequence and/or a reboot sequence.

Template policy 920 may define a range of information to which packets may be matched. The range of information (e.g., ranges 922 and 924) may be configured by, for example, a network administrator and may not be changed within member device 120 without performing a reconfiguration and re-commit sequence and/or a reboot sequence. As shown in FIG. 9, template policy 920 may include a range 922 of source addresses (e.g., 10.0.0.0/8 to 165.154.0.0/16) and a range 924 of destination addresses (e.g., 10.0.0.0/8 to 168.155.0.0/16) that define the scope of template policy 920. Additionally, or alternatively, other information, such as source ports, destinations ports, and/or protocols may also be used to define a scope of template policy 920.

Template policy 920 may also include dynamic policies 926. In implementations described herein, dynamic policies 926 may be pushed down to member device 120 (e.g., from group server 110) and implemented by member device 120 within template policy 920 without performing a reconfiguration and re-commit sequence and/or a reboot sequence. Dynamic policies 926 may be added to and deleted from template policy 920 as individual dynamic polices (e.g., "dynamic policy 1") or as groups of dynamic policies (e.g., "dynamic policy 1," "dynamic policy 2," and "dynamic policy 3").

Each dynamic policy 926 may be a subset (or an entire set) of a scope defined for template policy 920. For example, the source address (e.g., "10.1.1.0/24") and destination address (e.g., "20.1.1.0/24") for "Dynamic Policy 1" may be within ranges 922 and 924, respectively. If member device 120 (e.g., policy engine 410) matches a packet to template policy 920 during a lookup sequence, member device 120 may then apply dynamic policies 926 (e.g., in the sequence provided) to identify a match. One or more of dynamic policies 926 may be added, deleted, changed, etc. in real time (e.g., in response to a push message from group server 110). For example, if member device 120 receives a push message with a replacement set of dynamic policies 926, member device 120 may simply apply the replacement set to a lookup sequence for a subsequent packet.

Systems and/or methods described herein may provide dynamic security policy updates for members in a group VPN. A group server for the system and/or methods may receive, from a member device, a registration request for the group VPN and may send, to the member device, initial security policy data. The group server for the system and/or methods may receive instructions for a policy configuration change and may send, to the member device, a push message that includes dynamic policies to implement the policy configuration change. The dynamic policies may be implemented as a subset of the template policy configured on the member device. The member device for the system and/or methods may receive the push message with the dynamic policies, may associate the dynamic policies with the template policy, and may apply the initial security policy data and the dynamic policies to incoming traffic without the need for a reboot of the member device.

The systems and/or methods described herein may thus implement changes to firewall security policies without user intervention and on a real-time basis. New policies may be automatically validated and multiple dynamic policies associated with a template policy may be enabled/disabled in a single operation.

The foregoing description of example implementations provides illustration and description, but is not intended to be exhaustive or to limit the invention to the precise form disclosed. Modifications and variations are possible in light of the above teachings or may be acquired from practice of the invention.

For example, while series of blocks have been described with respect to FIGS. 6-8, the order of the blocks may be varied in other implementations. Moreover, non-dependent blocks may be implemented in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain implementations described herein may be implemented as a "component" that performs one or more functions. This component may include hardware, such as a processor, microprocessor, an application specific integrated circuit, or a field programmable gate array; or a combination of hardware and software.

It should be emphasized that the term "comprises" and/or "comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
   sending, by a device, a registration request to register the device to be part of a group virtual private network (VPN);
   receiving, by the device, initial security policy data after sending the registration request,
   the initial security policy data being associated with a first version;
   receiving, by the device, information regarding a policy change to be implemented by the device without rebooting or reconfiguring the device,
   the policy change being associated with a second version that is different from the first version,
   the policy change being associated with one or more dynamic policies to be implemented as a subset of a template policy that is included in the initial security policy data, and
   the template policy defining one or more ranges of addresses associated with the subset and one or more other subsets of the template policy;
   associating, by the device, the one or more dynamic policies with the template policy to obtain updated security policy data;
   performing, by the device, a security policy lookup for an incoming packet;

determining that there is no match with a configured policy based on the security policy lookup for the incoming packet;

determining whether the incoming packet is within a scope of the template policy in response to determining that there is no match with the configured policy; and selectively applying the template policy or a default policy to the incoming packet without rebooting the device by:

applying the template policy to the incoming packet in response to the incoming packet being within the scope of the template policy and without rebooting the device, or applying the default policy to the incoming packet in response to the incoming packet not being within the scope of the template policy and without rebooting the device.

2. The method of claim 1, where associating the one or more dynamic policies with the template policy includes:

associating the one or more dynamic policies with the template policy in real-time without rebooting or reconfiguring the device before applying the policy based on the updated policy data.

3. The method of claim 1, where the subset of the template policy is associated with one or more of:

a range of source ports,
a range of destination ports, or
a range of protocols within the template policy.

4. A device comprising:
a memory to store a plurality of instructions; and
a processor to execute the plurality of instructions in the memory to:

send, to a server, a registration request for the server to register the device to be part of a group virtual private network (VPN);

receive, from the server and based on the registration request, initial security policy data,
the initial security policy data being associated with a first version;

apply the initial security policy to first incoming traffic;
receive, from the server, information regarding a policy update to be implemented by the device without reconfiguring or rebooting the device,
the policy update being associated with a second version that is different from the first version,
the policy update being associated with one or more dynamic policies to be implemented as a subset of a template policy that is included in the initial security policy data, and
the template policy defining one or more ranges of addresses associated with a subset of the template policy;

associate the one or more dynamic policies with the template policy to obtain updated security policy data;

perform a security policy lookup for an incoming packet;

determine that there is no match with a configured policy based on the security policy lookup for the incoming packet;

determine whether the incoming packet is within a scope of the template policy in response to determining that there is no match with the configured policy; and selectively apply the template policy or a default policy to the incoming packet without rebooting the device, when selectively applying the template policy or the default policy to the incoming packet, the processor is to:

apply the template policy to the incoming packet in response to the incoming packet being within the scope of the template policy and without rebooting the device, or apply the default policy to the incoming packet in response to the incoming packet not being within the scope of the template policy and without rebooting the device.

5. The device of claim 4, where, when associating the one or more dynamic policies with the template policy, the processor is to:

determine a policy identifier based on the information regarding the policy update,
identify the template policy based on the policy identifier,
determine that the policy update is newer than the template policy, and
associate the one or more dynamic policies with the template policy after determining that the policy update is newer than the template policy.

6. The device of claim 4, where, when receiving the initial security policy data, the processor is to:
receive, as a reply to the registration request, a point-to-point message that includes the initial security policy data.

7. The device of claim 4, where, when receiving the information regarding the policy update, the processor is to:
receive, as a reply to the registration request, a multicast push message that includes the information regarding the policy update.

8. The method of claim 1, where receiving the information regarding the policy update comprises:
receiving an encrypted message that includes the information regarding the policy update that is encrypted with a key encapsulation key (KEK).

9. The method of claim 1, where the one or more ranges of addresses include a range of source addresses and a range of destination addresses.

10. The device of claim 4, where the subset of the template policy is associated with a range of protocols within the template policy.

11. The method of claim 1, where associating the one or more dynamic policies with the template policy includes:
determining an identifier based on the information regarding the policy change,
identifying the template policy based on the identifier,
determining that the policy change is newer than the template policy, and
associating the one or more dynamic policies with the template policy after determining that the policy change is newer than the template policy.

12. The method of claim 1, where receiving the initial security policy data comprises:
receiving, as a reply to the registration request, a message that includes the initial security policy data.

13. The method of claim 12, where the message includes a multicast push message.

14. The device of claim 4, where, when associating the one or more dynamic policies with the template policy, the processor is to:
associate the one or more dynamic policies with the template policy in real-time without rebooting or reconfiguring the device.

15. A non-transitory computer-readable medium storing instructions, the instructions comprising:

one or more instructions that, when executed by at least one processor of a device, cause the at least one processor to:
send a registration request to register the device to be part of a group virtual private network (VPN);
receive, after sending the registration request, initial security policy data,
the initial security policy data being associated with a first version;
receive information regarding a policy change to be implemented by the device without reconfiguring or rebooting the device,
the policy change being associated with a second version that is different from the first version,
the policy change being associated with one or more dynamic policies to be implemented as a subset of a template policy that is included in the initial security policy data, and
the template policy defining one or more ranges of addresses associated with a subset of the template policy;
associate the one or more dynamic policies with the template policy to obtain updated security policy data;
perform a security policy lookup for an incoming packet;
determine that there is no match with a configured policy based on the security policy lookup for the incoming packet;
determine whether the incoming packet is within a scope of the template policy in response to determining that there is no match with the configured policy; and
selectively apply the template policy or a default policy to the incoming packet without rebooting the device,
the one or more instructions to selectively apply the template policy or the default policy to the incoming packet comprising:
one or more instructions that, when executed by the at least one processor, cause the at least one processor to:
apply the template policy to the incoming packet in response to the incoming packet being within the scope of the template policy and without rebooting the device, or
apply the default policy to the incoming packet in response to the incoming packet not being within the scope of the template policy and without rebooting the device.

16. The non-transitory computer-readable medium of claim 15, where the subset of the template policy is associated with a subset of ports.

17. The non-transitory computer-readable medium of claim 15, where the one or more instructions to associate the one or more dynamic policies with the template policy comprise:
one or more instructions that, when executed by the at least one processor, cause the at least one processor to:
determine that the policy change is newer than the template policy, and
associate the one or more dynamic policies with the template policy after determining that the policy change is newer than the template policy.

18. The non-transitory computer-readable medium of claim 15, where the one or more instructions to associate the one or more dynamic policies with the template policy comprise:
one or more instructions that, when executed by the at least one processor, cause the at least one processor to:
associate the one or more dynamic policies with the template policy in real-time without rebooting the device.

19. The non-transitory computer-readable medium of claim 15, where the one or more instructions to receive the information regarding the policy change comprise:
one or more instructions that, when executed by the at least one processor, cause the at least one processor to:
receive an encrypted message that includes the information regarding the policy change that is encrypted with a key encapsulation key (KEK).

20. The non-transitory computer-readable medium of claim 15, where the one or more instructions to receive the information regarding the initial security policy data comprise:
one or more instructions that, when executed by the at least one processor, cause the at least one processor to:
receive, as a reply to the registration request, a point-to-point message that includes the initial security policy data.

21. The device of claim 15, where the subset of the template policy is associated with a range of protocols within the template policy.

* * * * *